(12) United States Patent  
Stein

(10) Patent No.: US 11,087,148 B2  
(45) Date of Patent: *Aug. 10, 2021

(54) BARRIER AND GUARDRAIL DETECTION USING A SINGLE CAMERA

(71) Applicant: Mobileye Vision Technologies Ltd., Jerusalem (IL)

(72) Inventor: Gideon Stein, Jerusalem (IL)

(73) Assignee: Mobileye Vision Technologies Ltd., Jerusalem (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/599,837

(22) Filed: Oct. 11, 2019

(65) Prior Publication Data

US 2020/0285864 A1 Sep. 10, 2020  
US 2021/0110171 A9 Apr. 15, 2021

Related U.S. Application Data

(63) Continuation of application No. 16/110,284, filed on Aug. 23, 2018, now Pat. No. 10,445,595, which is a (Continued)

(51) Int. Cl.
*G06K 9/00* (2006.01)
*G06K 9/62* (2006.01)
(Continued)

(52) U.S. Cl.
CPC ..... *G06K 9/00798* (2013.01); *G06K 9/00805* (2013.01); *G06K 9/6202* (2013.01);
(Continued)

(58) Field of Classification Search
None
See application file for complete search history.

(56) References Cited

U.S. PATENT DOCUMENTS 4,383,827 A 5/1983 Foerst
5,181,695 A 1/1993 Arthur
(Continued)

FOREIGN PATENT DOCUMENTS

DE 102010020688 A1 5/2011
EP 2431917 A1 3/2012
(Continued)

OTHER PUBLICATIONS

"European Application Serial No. 20181472.0, Extended European Search Report dated Nov. 12, 2020", 6 pgs.
(Continued)

*Primary Examiner* — Mohammad J Rahman
(74) *Attorney, Agent, or Firm* — Schwegman Lundberg & Woessner, P.A.

(57) ABSTRACT

Driver assistance systems for detecting a structural barrier extending along a road. The driver assistance system may be mountable in a host vehicle. The camera may capture multiple image frames in the forward field of view of the camera. A processor may process motion of images of the barrier in the image frames. The camera may be a single camera. The motion of the images may be responsive to forward motion of the host vehicle and/or the motion of the images may be responsive to lateral motion of the host vehicle.

21 Claims, 8 Drawing Sheets

Related U.S. Application Data continuation of application No. 15/012,455, filed on Feb. 1, 2016, now Pat. No. 10,078,788, which is a continuation of application No. 13/237,163, filed on Sep. 20, 2011, now Pat. No. 9,280,711.

(60) Provisional application No. 61/385,122, filed on Sep. 21, 2010.

(51) Int. Cl.
- G06T 3/00 (2006.01)
- G06T 7/73 (2017.01)
- G06T 7/246 (2017.01)
- H04N 7/18 (2006.01)

(52) U.S. Cl.
CPC ............ *G06T 3/0093* (2013.01); *G06T 7/248* (2017.01); *G06T 7/74* (2017.01); *H04N 7/183* (2013.01); *G06T 2207/10004* (2013.01); *G06T 2207/30256* (2013.01); *G06T 2207/30261* (2013.01)

(56) References Cited

U.S. PATENT DOCUMENTS

| | | | |
|---|---|---|---|
| 5,259,040 A | 11/1993 | Hanna | |
| 6,192,145 B1 | 2/2001 | Anandan et al. | |
| 6,704,621 B1 | 3/2004 | Stein et al. | |
| 6,731,777 B1* | 5/2004 | Nishigaki | G01C 3/085 382/104 |
| 6,813,370 B1* | 11/2004 | Arai | G06T 7/593 382/104 |
| 6,829,388 B1 | 12/2004 | Sakurai | |
| 6,853,738 B1* | 2/2005 | Nishigaki | G01C 3/085 348/139 |
| 6,985,619 B1* | 1/2006 | Seta | G06K 9/00798 382/154 |
| 7,038,577 B2 | 5/2006 | Pawlicki et al. | |
| 7,113,887 B2 | 9/2006 | Stein | |
| 7,151,996 B2 | 12/2006 | Stein | |
| 7,411,486 B2 | 8/2008 | Gern et al. | |
| 7,447,380 B2 | 11/2008 | Williams et al. | |
| 7,489,812 B2 | 2/2009 | Fox et al. | |
| 7,566,851 B2 | 7/2009 | Stein et al. | |
| 7,623,681 B2 | 11/2009 | Miyahara | |
| 7,706,978 B2* | 4/2010 | Schiffmann | G01S 13/931 701/301 |
| 7,786,898 B2 | 8/2010 | Stein et al. | |
| 8,064,643 B2 | 11/2011 | Stein et al. | |
| 8,310,355 B2 | 11/2012 | Chen et al. | |
| 8,670,592 B2* | 3/2014 | Zhang | B60W 30/09 382/104 |
| 8,675,122 B2 | 3/2014 | Kroepfl et al. | |
| 9,118,816 B2 | 8/2015 | Stein et al. | |
| 9,280,711 B2 | 3/2016 | Stein | |
| 9,959,595 B2 | 5/2018 | Livyatan et al. | |
| 10,078,788 B2 | 9/2018 | Stein | |
| 10,115,027 B2 | 10/2018 | Stein | |
| 10,445,595 B2 | 10/2019 | Stein | |
| 2002/0114525 A1* | 8/2002 | Bolle | H04N 19/162 382/232 |
| 2002/0183906 A1 | 12/2002 | Ikeda | |
| 2003/0016287 A1* | 1/2003 | Nakayama | G06T 7/12 348/148 |
| 2003/0137673 A1 | 7/2003 | Cox et al. | |
| 2003/0169213 A1 | 9/2003 | Spero | |
| 2006/0197839 A1 | 9/2006 | Senior et al. | |
| 2007/0047809 A1* | 3/2007 | Sasaki | G06K 9/00791 382/170 |
| 2007/0191997 A1 | 8/2007 | Isaji et al. | |
| 2008/0044224 A1 | 2/2008 | Bleiner et al. | |
| 2008/0137908 A1 | 6/2008 | Stein et al. | |
| 2008/0191901 A1 | 8/2008 | Bleiner et al. | |
| 2008/0288140 A1 | 11/2008 | Matsuno | |
| 2008/0298657 A1 | 12/2008 | Shiraishi et al. | |
| 2008/0310680 A1 | 12/2008 | Azuma | |
| 2009/0010482 A1 | 1/2009 | Nishida et al. | |
| 2009/0010495 A1 | 1/2009 | Schamp et al. | |
| 2009/0028389 A1* | 1/2009 | Edanami | G06K 9/00805 382/104 |
| 2009/0169052 A1 | 7/2009 | Seki et al. | |
| 2009/0234543 A1 | 9/2009 | Groitzsch et al. | |
| 2010/0054538 A1 | 3/2010 | Boon | |
| 2010/0098297 A1* | 4/2010 | Zhang | G06K 9/4652 382/104 |
| 2010/0100321 A1 | 4/2010 | Koenig et al. | |
| 2010/0104199 A1 | 4/2010 | Zhang et al. | |
| 2010/0114416 A1 | 5/2010 | Au et al. | |
| 2010/0183192 A1* | 7/2010 | Fritsch | G06T 7/254 382/103 |
| 2010/0208034 A1 | 8/2010 | Chen | |
| 2010/0228437 A1 | 9/2010 | Hanzawa et al. | |
| 2010/0246896 A1* | 9/2010 | Saito | G06K 9/00798 382/106 |
| 2010/0315505 A1* | 12/2010 | Michalke | G06T 7/251 348/118 |
| 2010/0329513 A1* | 12/2010 | Klefenz | G06K 9/00805 382/104 |
| 2011/0063097 A1 | 3/2011 | Naka et al. | |
| 2011/0115912 A1* | 5/2011 | Kuehnle | G06K 9/00798 348/148 |
| 2011/0187863 A1 | 8/2011 | Glander et al. | |
| 2011/0199200 A1 | 8/2011 | Lueke et al. | |
| 2011/0254915 A1 | 10/2011 | Vincent et al. | |
| 2011/0255741 A1 | 10/2011 | Jung et al. | |
| 2011/0262009 A1 | 10/2011 | Duan et al. | |
| 2012/0033074 A1 | 2/2012 | Spangenberg | |
| 2012/0069185 A1 | 3/2012 | Stein | |
| 2012/0133738 A1 | 5/2012 | Hoffmeier et al. | |
| 2012/0224062 A1 | 9/2012 | Lacoste | |
| 2012/0229607 A1* | 9/2012 | Baker | G01C 11/00 348/46 |
| 2013/0128049 A1 | 5/2013 | Schofield et al. | |
| 2013/0156336 A1 | 6/2013 | Suk et al. | |
| 2013/0177237 A1 | 7/2013 | Schamp | |
| 2013/0300870 A1 | 11/2013 | Messely et al. | |
| 2014/0112544 A1 | 4/2014 | Yu et al. | |
| 2014/0161323 A1 | 6/2014 | Livyatan et al. | |
| 2014/0169627 A1 | 6/2014 | Gupta | |
| 2014/0247358 A1 | 9/2014 | Takeda et al. | |
| 2016/0148060 A1 | 5/2016 | Stein | |
| 2017/0177953 A1 | 6/2017 | Stein | |
| 2018/0365502 A1 | 12/2018 | Stein | |

FOREIGN PATENT DOCUMENTS

| | | |
|---|---|---|
| EP | 2431917 B1 | 1/2018 |
| EP | 3301612 A1 | 4/2018 |
| JP | 2003233899 A | 8/2003 |
| JP | 2003281552 A | 10/2003 |
| JP | 2007309799 A | 11/2007 |
| WO | WO-2010032523 A1 | 3/2010 |
| WO | WO-2010069167 A1 | 6/2010 |

OTHER PUBLICATIONS

U.S. Appl. No. 13/237,163 U.S. Pat. No. 9,280,711, filed Sep. 20, 2011, Barrier and Guardrail Detection Using a Single Camera.

U.S. Appl. No. 15/012,455 U.S. Pat. No. 10,078,788, filed Feb. 1, 2016, Barrier and Guardrail Detection Using a Single Camera.

U.S. Appl. No. 15/451,146 U.S. Pat. No. 10,115,027, filed Mar. 6, 2017, Barrier and Guardrail Detection Using a Single Camera.

U.S. Appl. No. 16/110,284 U.S. Pat. No. 10,445,595, filed Aug. 23, 2018, Barrier and Guardrail Detection Using a Single Camera.

"U.S. Appl. No. 13/237,163, Corrected Notice of Allowability dated Feb. 5, 2016", 2 pgs.

"U.S. Appl. No. 13/237,163, Examiner Interview Summary dated Jul. 7, 2015", 3 pgs.

"U.S. Appl. No. 13/237,163, Final Office Action dated Jan. 12, 2015", 16 pgs.

(56) References Cited

OTHER PUBLICATIONS

"U.S. Appl. No. 13/237,163, Final Office Action dated Feb. 27, 2014", 15 pgs.
"U.S. Appl. No. 13/237,163, Non Final Office Action dated Sep. 11, 2014", 15 pgs.
"U.S. Appl. No. 13/237,163, Non Final Office Action dated Oct. 16, 2013", 15 pgs.
"U.S. Appl. No. 13/237,163, Notice of Allowance dated Sep. 30, 2015", 8 pgs.
"U.S. Appl. No. 13/237,163, Response filed Jan. 13, 2014 to Non Final Office Action dated Oct. 16, 2013", 10 pgs.
"U.S. Appl. No. 13/237,163, Response filed May 29, 2014 to Final Office Action dated Feb. 27, 2014", 11 pgs.
"U.S. Appl. No. 13/237,163, Response filed Jul. 13, 2015 to Final Office Action dated Jan. 12, 2015", 11 pgs.
"U.S. Appl. No. 13/237,163, Response filed Dec. 4, 2014 to Non Final Office Action dated Sep. 11, 2014", 12 pgs.
"U.S. Appl. No. 14/182,715, Advisory Action dated Dec. 14, 2016", 3 pgs.
"U.S. Appl. No. 14/182,715, Final Office Action dated Sep. 15, 2016", 20 pgs.
"U.S. Appl. No. 14/182,715, Non Final Office Action dated Feb. 19, 2016", 18 pgs.
"U.S. Appl. No. 14/182,715, Non Final Office Action dated Apr. 26, 2017", 31 pgs.
"U.S. Appl. No. 14/182,715, Notice of Allowance dated Dec. 28, 2017", 9 pgs.
"U.S. Appl. No. 15/012,455, Examiner Interview Summary dated Feb. 8, 2018", 3 pgs.
"U.S. Appl. No. 15/012,455, Final Office Action dated Mar. 23, 2017", 7 pgs.
"U.S. Appl. No. 15/012,455, Non Final Office Action dated Mar. 28, 2016", 8 pgs.
"U.S. Appl. No. 15/012,455, Non Final Office Action dated Nov. 1, 2017", 10 pgs.
"U.S. Appl. No. 15/012,455, Notice of Allowance dated May 16, 2018", 9 pgs.
"U.S. Appl. No. 15/012,455, Notice of Non-Compliant Amendment dated May 17, 2016", 3 pgs.
"U.S. Appl. No. 15/012,455, Response filed Feb. 1, 2018 to Non Final Office Action dated Nov. 1, 2017", 9 pgs.
"U.S. Appl. No. 15/012,455, Response filed Apr. 12, 2016 to Non Final Office Action dated Mar. 28, 2016", 7 pgs.
"U.S. Appl. No. 15/012,455, Response filed Aug. 23, 2017 to Final Office Action dated Mar. 23, 2017", 7 pgs.
"U.S. Appl. No. 15/012,455, Response filed Dec. 27, 2016 to Notice of Non-Compliant Amendment dated May 17, 2016", 4 pgs.
"U.S. Appl. No. 15/451,146, Examiner Interview Summary dated Apr. 18, 2018", 2 pgs.
"U.S. Appl. No. 15/451,146, Non Final Office Action dated Dec. 15, 2017", 10 pgs.
"U.S. Appl. No. 15/451,146, Notice of Allowance dated Jun. 26, 2018", 7 pgs.
"U.S. Appl. No. 15/451,146, Response filed May 15, 2018 to Non Final Office Action dated Dec. 15, 2017", 11 pgs.
"U.S. Appl. No. 16/110,284, Examiner Interview Summary dated Jan. 15, 2019", 3 pgs.
"U.S. Appl. No. 16/110,284, Non Final Office Action dated Sep. 27, 2018", 10 pgs.
"U.S. Appl. No. 16/110,284, Notice of Allowance dated Jun. 5, 2019", 8 pgs.
"U.S. Appl. No. 16/110,284, Preliminary Amendment filed Aug. 24, 2018", 3 pgs.
"U.S. Appl. No. 16/110,284, Response file Feb. 27, 2019 to Non Final Office Action dated Sep. 27, 2018", 9 pgs.
"European Application Serial No. 11182201.1, Communication Pursuant to Article 94(3) EPC Oct. 13, 2016", 4 pgs.
"European Application Serial No. 11182201.1, Communication Pursuant to Article 94(3) EPC Dec. 16, 2015", 4 pgs.
"European Application Serial No. 11182201.1, Communication Pursuant to Article 94(3) EPC dated Oct. 13, 2016", 4 pgs.
"European Application Serial No. 11182201.1, Communication Pursuant to Article 94(3) EPC dated Dec. 16, 2015", 4 pgs.
"European Application Serial No. 11182201.1, Extended European Search Report dated Feb. 3, 2012", 6 pgs.
"European Application Serial No. 11182201.1, Intention to Grant dated Jul. 11, 2017", 34 pgs.
"European Application Serial No. 11182201.1, Response filed Apr. 10, 2017 to Communication Pursuant to Article 94(3) EPC Oct. 13, 2016", 15 pgs.
"European Application Serial No. 11182201.1, Response filed Apr. 15, 2016 to Communication Pursuant to Article 94(3) EPC Dec. 16, 2015", 13 pgs.
"European Application Serial No. 11182201.1, Response filed Sep. 21, 2012 to Extended European Search Report dated Feb. 3, 2012", 17 pgs.
"European Application Serial No. 17203013.2, Extended European Search Report dated Jan. 10, 2018", 3 pgs.
"European Application Serial No. 17203013.2, Response filed Oct. 3, 2018 to Extended European Search Report dated Jan. 10, 2018", 7 pgs.
Arrospide, Jon, et al., "Homography-based ground plane detection using a single on-board camera", Intelligent Transport Systems, IET 4.2, (2010), 149-160.
Avidan, et al., "Trajectory Triangulation: 3D Reconstruction of Moving Points from a Monocular Image Sequence", IEEE Transactions on Pattern Analysis and Machine Intelligence, vol. 22, No. 4, (Apr. 2000), 348-357.
Conrad, Daniel, "Homography-based ground plane detection for mobile robot navigation using a modified em algorithm", Robotics and Automation (ICRA), 2010 IEEE International Conference on IEEE, (2010).
Harpreet, S Sawhney, "Simplifying motion and structure analysis using planar parallax and image warping", International Conference on Pattern Recognition, (1994), 403-408.
Jain, Ramesh, et al., "Depth", Machine vision, vol. 5. New York: McGraw-Hill, Chapter 11, (1995), 289-308.
Klappenstein, Jens, "Applying Kalman filtering to road homography estimation", Proc. Workshop Planning Perception Navigation Intelligent Vehicles (in conjunction with IEEE Int. Conf. Robotics Automation), (2007), 6 pgs.
Livyatan, et al., "Dense Structure From Motion", U.S. Unpublished Appl. No. 15/957,763, filed Apr. 19, 2018, 18 pgs.
R, Wallace, et al., "Progress in robot road-following", IEEE, (1986), 1615-1621.
Stein, Gideon P, et al., "A Robust Method for Computing Vehicle Ego-motion", Proceedings of IEEE Intelligent Vehicles Symposium, (Oct. 3-5 2000), 362-368.
Yu-Lun, Chen, "Disparity and Depth Map Computation", Masters Thesis, Department of Computing Science National Chengchi University, Chapter 3, (Apr. 2006), 27-37.
Zhang, Chenxi, "Semantic segmentation of urban scenes using dense depth maps", Computer Vision—ECCV, Springer Berlin Heidelberg, (2010), 708-721.

* cited by examiner

BARRIER AND GUARDRAIL DETECTION USING A SINGLE CAMERA

CROSS REFERENCE TO RELATED APPLICATIONS

This application is a continuation of U.S. patent application Ser. No. 16/110,284, filed Aug. 23, 2018, which is a continuation of U.S. patent application Ser. No. 15/012,455, filed Feb. 1, 2016, which is a continuation of U.S. patent application Ser. No. 13/237,163, filed Sep. 20, 2011, which claims the benefit of U.S. Provisional Patent Application No. 61/385,122, filed Sep. 21, 2010, the entire contents of which are incorporated herein by reference.

BACKGROUND

1. Technical Field

The present disclosure relates to driver assistance systems and particularly to a method for detection along a road traveled by a vehicle, the presence of a guard rail or a vertical lane divider using a camera and, more particularly to estimate the lateral distance to the guard rail or the concrete lane divider.

2. Description of Related Art

During the last few years camera based driver assistance systems (DAS) have been entering the market; including lane departure warning (LDW), automatic high-beam control (AHC), traffic sign recognition (TSR) and forward collision warning (FCW).

Lane departure warning (LDW) systems are designed to give a warning in the case of unintentional lane departure. The warning is given when the vehicle crosses or is about to cross the lane marker. Driver intention is determined based on use of turn signals, change in steering wheel angle, vehicle speed and brake activation. There are various LDW systems available, One algorithm for lane departure warning (LDW) used by the Applicant/assignee (Mobileye Technologies Ltd., Nicosia, Cyprus, hereinafter "Mobileye") of the present application is predictive in that it computes time-to-lane crossing (TLC) based on change in wheel-to-bane distance and warns when the time-to-lane crossing (TLC) is below a certain threshold. Other algorithms give a warning if the wheel is inside a certain zone around the lane marker. In either case, essential to the lane departure warning system is the lane marker detection algorithm. Typically, the lane markers are detected in the camera image and then, given the known camera geometry and camera location relative to the vehicle, the position of the vehicle relative to the lane is computed. The lane markers detected in the camera image are then collected over time, for instance using a Kalman filter. Wheel-to-lane marker distance may be given with an accuracy of better than 5 centimeters. With a forward looking camera, wheel-to-lane marker distance is not observed directly but is extrapolated from the forward view of the camera. The closer road markings are observed, less extrapolation is required for determining wheel-to-lane marker distance and more accurate estimates of wheel-to-lane marker distance are achieved especially on curves of the road. Due to the car hood and the location of the camera, the road is seldom visible closer than six meters in front of the wheels of the car. In some cars with longer hoods, minimal distance to visible road in front of the car is even greater. Typically the lane departure warning system of Mobileye works on sharp curves (with radius down to 125 m). With a horizontal field of view (FOV) of 39 degrees of the camera, the inner lane markers are still visible on curves with a radius down to 125 meters. In order to correctly perform lane assignment on curves, lane markings are detected at 50 meters and beyond, With a horizontal field of view (FOV) of 39 degrees for the camera, a lane mark of width 0.1 meters at 50 m distance corresponds in the image plane to just under two pixels wide and can be detected accurately. The expectation from the lane departure warning systems is greater than 99% availability when lane markings are visible. Expectation with 99% availability is particularly challenging to achieve in low light conditions when the lane markings are not freshly painted (have low contrast with the road) and the only light source is the car halogen headlights. In low light conditions, the lane markings are only visible using the higher sensitivity of the clear pixels (i.e. using a monochrome sensor or a red/clear sensor). With the more powerful xenon high intensity discharge (HID) headlights it is possible to use a standard red green blue (RGB) sensor in most low light conditions.

The core technology behind forward collision warning (FCW) systems and headway distance monitoring is vehicle detection. Assume that reliable detection of vehicles in a single image a typical forward collision warning (FCW) system requires that a vehicle image be 13 pixels wide, then for a ear of width 1.6 m, a typical camera (640×480 resolution and 40 deg FOV) gives initial detection at 115 m and multi-frame approval at 100 m. A narrower horizontal field of view (FOV) for the camera gives a greater detection range however; the narrower horizontal field of view FOV) will reduce the ability to detect passing and cutting-in vehicles. A horizontal field of view (FOV) of around 40 degrees was found by Mobileye to be almost optimal (in road tests conducted with a camera) given the image sensor resolution and dimensions. A key component of a typical forward collision warning (FCW) algorithm is the estimation of distance from a single camera and the estimation of scale change from the time-to-contact/collision (TTC) as disclosed for example in U.S. Pat. No. 7,113,867.

A recent U.S. Pat. No. 7,411,486 states (column 1, lines 35-37) that lane-departure warning systems which are equipped with only one image-transmitting sensor are not capable of differentiating between edge-of-lane markings and a structural boundary at the edge of the lane. (emphasis added) Consequently, U.S. Pat. No. 7,411,486 discloses a driver assistance system for warning a driver of a motor vehicle of a risk of departure from the lane. The disclosed system includes a camera for detecting edge-of-lane and/or lane markings in the area sensed by the camera, and in addition a distance sensor with which the distance from objects elevated with respect to the surface of the lane can be determined in the region of the edge of the lane, in particular of a structural boundary of the edge of the lane.

Thus there is a need for and it would be advantageous to have a driver assistance system and corresponding method adapted to perform and vertical structural barrier or guardrail detection along the edge of the road or a lane using a camera and without requiring use of an additional sensor for instance to detect distance to the guardrail or barrier.

BRIEF SUMMARY

Various methods are disclosed herein for detecting a structural barrier extending along a road. The methods are performable by a driver assistance system mountable in a host vehicle. The driver assistance system may include a camera operatively connected to a processor. Multiple image frames may be captured in the forward field of view of the camera. In the image frames, motion of images of the barrier are processed to detect the barrier. The camera may be a single camera. The motion of the images may be responsive to forward motion of the host vehicle and/or the motion of the images may be responsive to lateral motion of the host vehicle.

The structural barrier may include multiple posts, Multiple linear image structures are hypothesized in an image frame as projections of the barrier onto the road surface and multiple vertical image coordinates are obtained respectively from the linear image structures. The linear mage structures may be image lines which run parallel to the image of the road and intersect the vanishing point of the image of the lane markers.

Multiple forward distances and corresponding lateral distances to the posts are computed based on the vertical image coordinates. Based on the known forward motion of the host vehicle and horizontal image coordinates of the linear image structures new horizontal image coordinates of the linear image structures are computed. The horizontal image coordinate in a second image frame of one of the images of the linear image structures is selected to align an image of one of the posts.

Alternatively, for each of the posts, forward distances from the host vehicle to the posts may be determined based on the motion of the images and the forward motion of the host vehicle, Lateral distances to the posts from the host vehicle may be determined from the forward distances and the horizontal image coordinates of the posts. Road plane lines at the lateral distances may be hypothesized to form multiple hypothesized road plane lines as projections of the vertical structural barrier onto the road surface. The hypothesized road plane lines at the lateral distances may be projected onto an image of the vertical structural barrier in an image flame. The correct road plane line is selected from the hypothesized road plane lines by aligning the correct road plane line with the image of the vertical structural barrier in the image frame.

Alternatively for a barrier without substantial vertical image texture, an image patch may be located in one of the image frames on an image line intersecting the vanishing point in the image frame. The image patch may be warped based on a vertical surface model. The vertical structural barrier may be detected by ascertaining that the patch is an image of the vertical structural barrier when points in columns of the patch scale vertically with host vehicle motion. Alternatively, the image patch may be warped based on a road surface model, and the patch may be an image of the road surface when points in rows of the patch scale horizontally with host vehicle motion.

Various driver assistance systems may be provided for detecting a structural barrier extending along a road, The driver assistance system may be mountable in a host vehicle. The camera may capture multiple image frames in the forward field of view of the camera. A processor may process motion of images of the barrier in the image frames. The camera, may be a single camera. The camera may be configured to view in the direction of forward motion of the host vehicle. The motion of the images may be responsive to forward motion of the host vehicle and/or the motion of the images may be responsive to lateral motion of the host vehicle.

The motion of the images of the structural barrier may correlate with an image line in the direction of the vanishing point of the road, wherein the image line corresponds to a vertical projection of the structural barrier onto the road plane.

The processor may be operable to hypothesize linear image structures as projections of the structural barrier onto the road plane to produce multiple hypotheses. Each of the hypotheses gives a lateral position of the barrier relative to the host vehicle. For each hypothesis, the lateral positions and host vehicle motion are used to predict image motion. The predicted in motion is compared to the actual image motion to verify the hypothesis and to derive the actual lateral position of the structural barrier relative to the host vehicle.

Motion of the host vehicle may have a lateral component relative to the road direction and the image motion is of an image line in the image that is above the linear image structure The image line may be that of the top of the barrier. Vertical motion or looming of the image line may be used to determine lateral distance between the host vehicle and the structural barrier to determine whether the image line is of the same lateral distance as the linear image structure (the barrier) or on the road surface farther away.

The processor may be operable to hypothesize multiple linear image structures in an image frame as projections of the barrier onto the road surface and obtain thereby multiple vertical image coordinates respectively from the linear image structures. The processor may be operable to compute multiple forward distances and corresponding lateral distances to the posts based on the vertical image coordinates. Based on the known forward motion of the host vehicle and horizontal image coordinates of the linear image structures, the processor may be operable to compute new horizontal image coordinates of the linear image structures to select the horizontal image coordinate in a second image frame of one of the images of the linear image structures and to align an image of one of the posts.

Alternatively, for each of the posts, the processor may be operable to determine forward distances from the host vehicle to the posts based on the motion of the images and the forward motion of the host vehicle. The processor may be operable to compute lateral distances to the posts from the host vehicle from the forward distance and horizontal image coordinates x of the posts. The processor may be operable to hypothesize road plane lines at the lateral distances, to form multiple hypothesized road plane lines as projections of the structural barrier onto the road surface; to project the hypothesized road plane lines at the lateral distances onto an image of the structural barrier in an image frame. The processor may be operable to select the correct road plane line from the hypothesized road plane lines by aligning the correct road plane line with the image of the structural barrier in the image frame.

Alternatively for a barrier without substantial vertical image texture, the processor may be operable to locate in one of the image frames an image patch on an image line intersecting the vanishing point in an image frame, to warp said image patch based on a vertical surface model and to detect the structural barrier by ascertaining that the patch may be an image of the structural harrier when points in columns of the patch scale vertically with host vehicle motion. Or, the processor may be operable to ascertain that the patch may be an image of the road surface if or when points in rows of the patch scale horizontally with host vehicle motion.

BRIEF DESCRIPTION OF THE DRAWINGS

The invention is herein described, by way of example only, with reference to the accompanying drawings, wherein.

DETAILED DESCRIPTION

Figure 1:
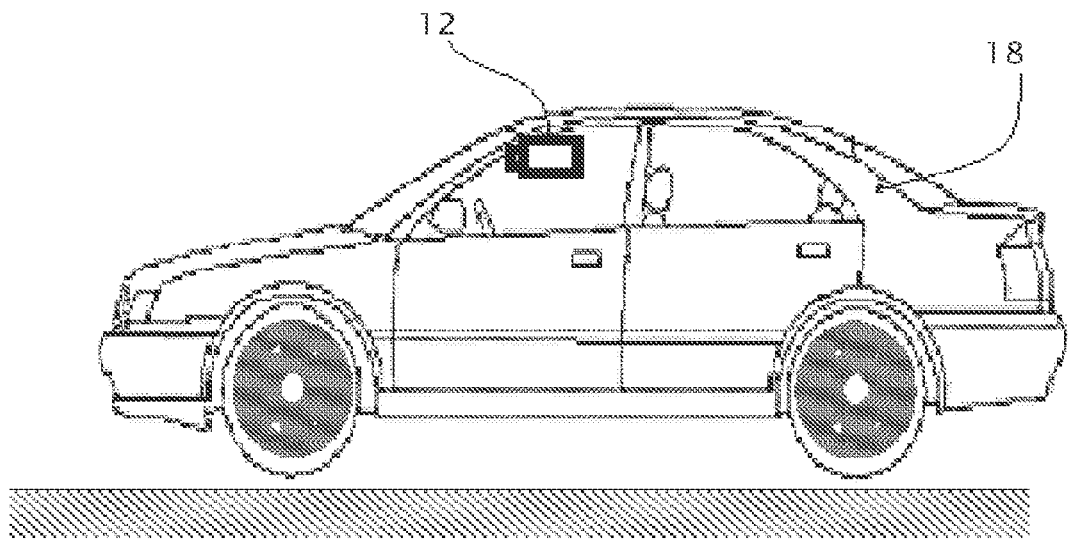
FIGS. 1 and 2 which illustrate a system including a camera or image sensor mounted in a vehicle, according to an aspect of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention may be directed to detection of guard rails and/or other generic structural barriers by image processing using a monochromatic camera which may be dedicated to multiple driver assistance systems or functions running simultaneously and/or in parallel in a host vehicle. The use of another sensor, (e.g. time-of-flight laser distance sensor or a second camera) other than a single camera may be avoided, to sense the presence of a structural barrier extending along the edge of the road. The camera may be mountable behind the windshield with the optical axis of the camera substantially parallel to the forward direction (Z) of motion of the host vehicle so that the camera may be forward viewing.

The term "structural barrier" as used herein is a road barrier installed and extending along a road at the side of a road, at the median of a divided highway or as a lane divider. The structural barrier may be a concrete barrier, Jersey, barrier, a metal guard rail or a cable barrier. The concrete barrier may include anti glare slats on top as disclosed in U.S. Pat. No. 5,181,695. The terms "structural barrier" and "vertical structural barrier" are used herein interchangeably.

The term "posts" as used herein refers to an imageable vertical texture in a structural barrier and may include any vertical structure or surface texture, e.g painted stripes, or the anti-glare slats. Hence, The terms "vertical texture" and "post" are used herein interchangeably.

Figure 2:
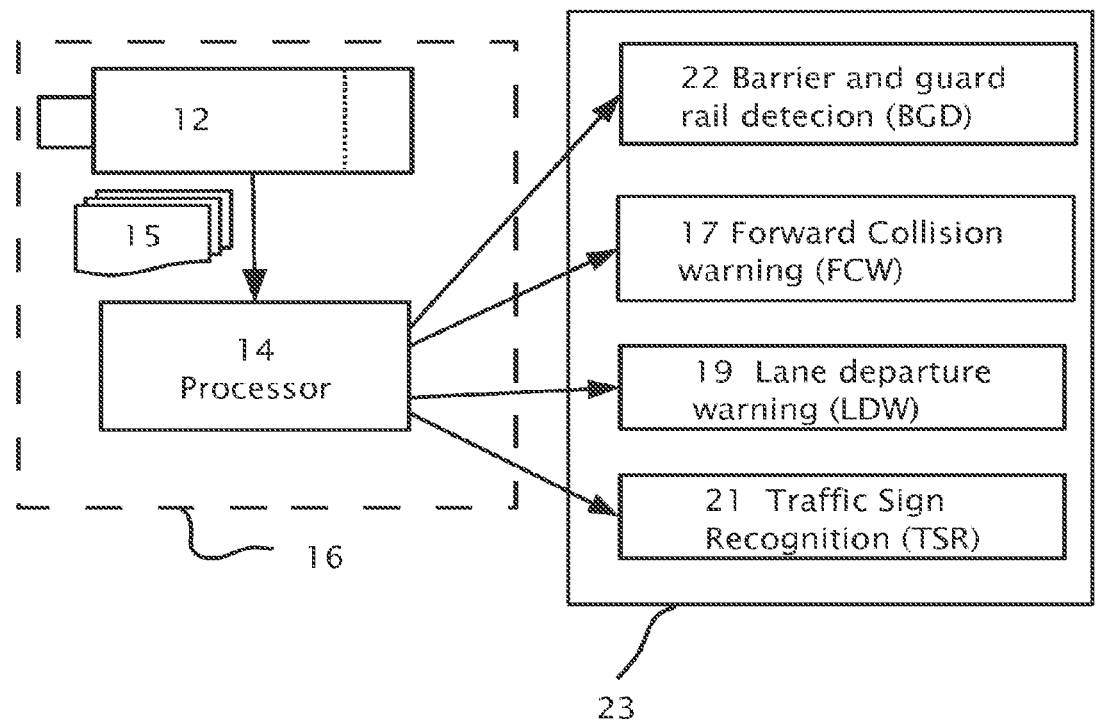

Reference is now made to FIGS. 1 and 2 which illustrate a system 16 including a camera or image sensor 12 mountable in a vehicle 18, according to an aspect of the present invention. Image sensor 12, imaging a field of view in the forward direction typically delivers images in real time and the images may be captured in a time series of image frames 15. An image processor 14 may be used to process image frames 15 simultaneously and/or in parallel to serve a number of driver assistance systems. Image sensor 12 is typically monochrome or black-white, i.e. without color separation. By way of example in FIG. 2, image frames 15 may be used to serve a warning system 23 which may include collision warning 17, lane departure warning 19, traffic sign recognition (TSR) 21 and barrier and guard rail detection 22 (BGD). Image processor 14 is used to process image frames 15 to detect barriers and/or guardrails in the forward field of view of camera 12. The terms "camera" and "image sensor" are used herein interchangeably.

The detection of guard rails, structural barriers, e.g. concrete lane dividers is important for many driver assistance functions. Aspects of the present invention may include exchange of information between barrier and/or guardrail detection 22 and other driver assistance functions and/or systems including but not limited by FCW 17 and LDW 19. For example, a Lane Departure Warning (LDW) 19 as part of warning system 23, may respond more strongly to a lane departure towards a guard rail or a barrier rather than a lane marker or even a white line. A Forward Collision Warning (FCW) system 19 may trigger sooner if the path to either side of in-path vehicle is blocked by a guard rail or another vehicle.

The term "object" as used herein refers to an object in real space being viewed by a camera. A guard rail along the edge of a road and a lane marker in the road are examples of objects. The term "image" refers to the image of one or more objects in image space at the focal plane of camera 12, image coordinates (x,y) in small letters refer to image space and may be in arbitrary units or numbers of picture elements in the horizontal and vertical directions with the pixel dimensions assumed. The term "image motion" refers to motion of an image of an object in image space. From image frame 15 to a subsequent image frame 15 the points of the image of the object may map from one set of coordinates (x1,y1) to a different set of coordinates (x2,y2). The term "image motion" refers to the mapping of coordinates of an image from image frame to image frame or a function of the mapping. The term "projection" or "projecting" as used herein refers to camera or perspective projection unless otherwise indicated by the context.

Figure 4:
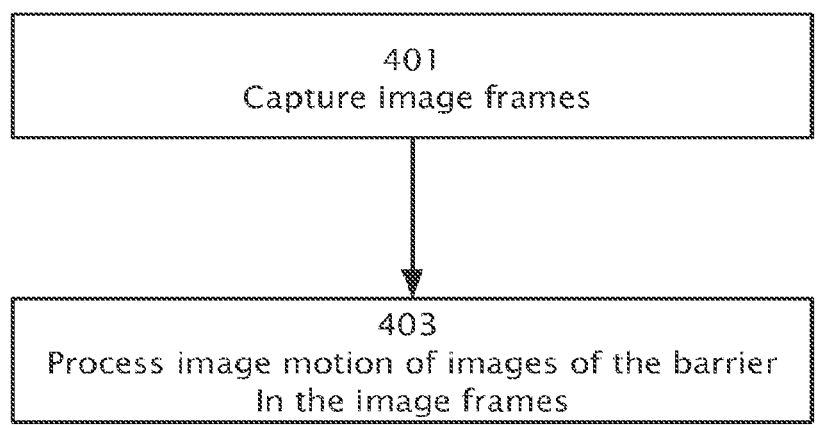
FIG. 4 illustrates a simplified generalized method, according to aspects of the present invention.

FIG. 4 illustrates a simplified generalized method, according to aspects of the present invention. The term "capture" as used herein refers to the real time recording and/or storage of image frames 15 in memory, for example volatile and/or non-volatile memory accessible by processor 14. In step 401, image frames are captured by camera 12 and in step 403 the image motion of guardrails and/or structural barriers along the edge of the road may be processed while host vehicle 18 is moving on the road.

Figure 3:
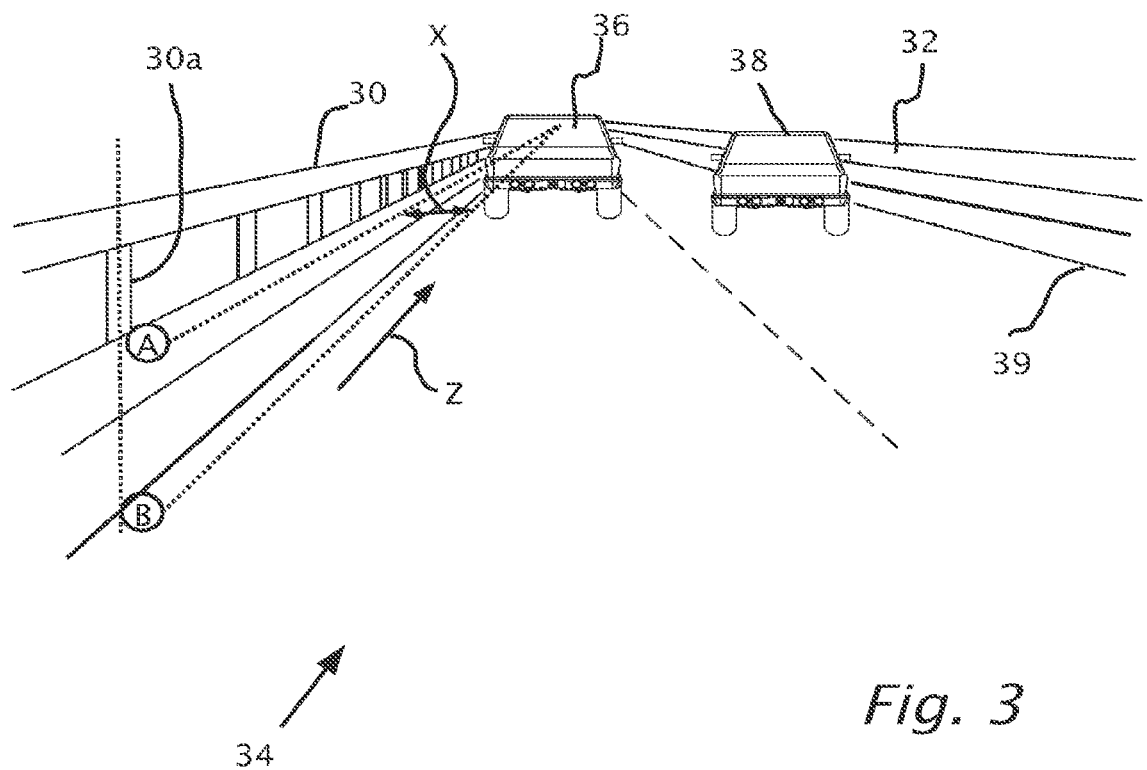
FIG. 3 shows a road scene according to an aspect of the present invention.
Figure 5A:
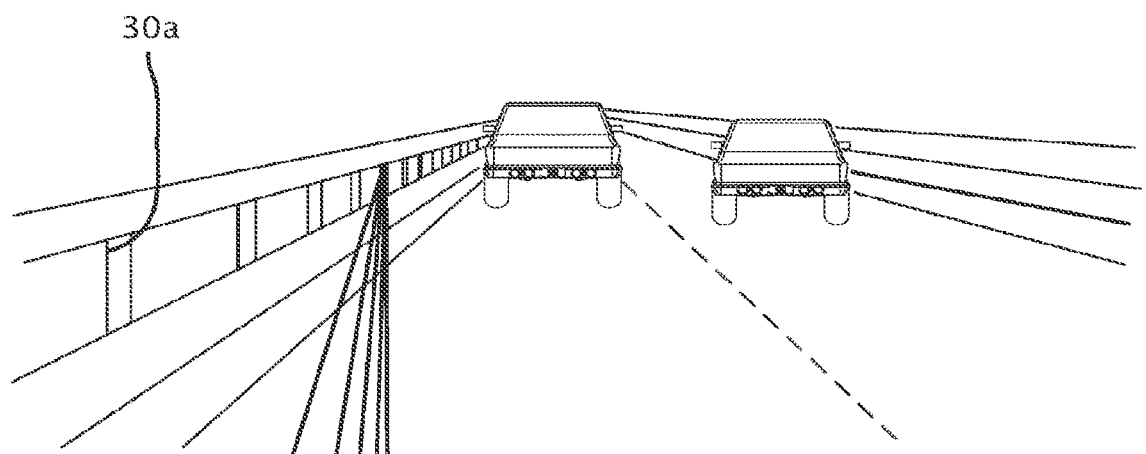
FIGS. 5*a* and 5*b* illustrates matching of images of a vertical post of a guard rail to a a number of similar images in a second image frame, according to an aspect of the present invention.
Figure 5B:
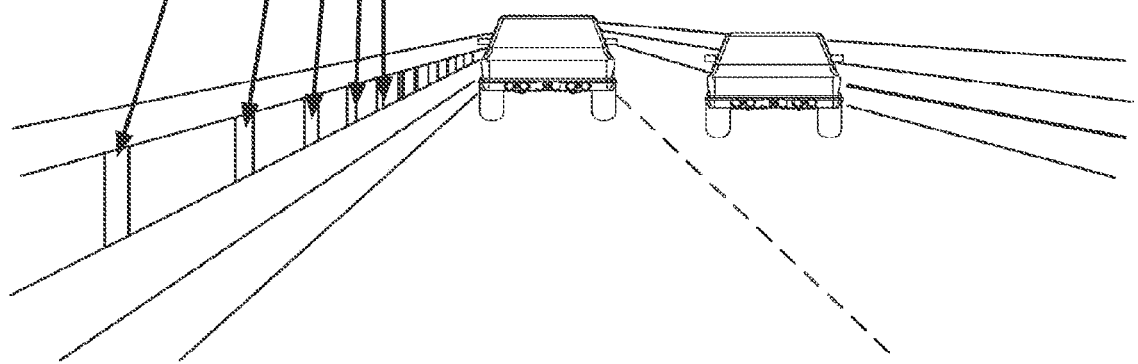

Reference is now made to FIG. 3 which shows an image frame 34 of a road scene as viewed through the windshield of host vehicle 18 by camera 12, according to aspects of the present invention, Real space coordinates (X,Y,Z) usually in meters are indicated using capital letters. Distance Z from camera 12 or from the front of vehicle 18 is in the forward direction of motion of vehicle 18. Lateral distance X is in the plane of the road perpendicular to forward direction. Host vehicle 18 may be fast approaching an in-path target vehicle 36 ahead. The lane on the right of vehicle 36 may be blocked by another vehicle 38. The exact location of road divider or barrier 30 on the left may be important to determine if there is an open path on the left. Image frame 34 shows two examples of structural barriers; mixed concrete and metal barrier 30 on the left and a solid concrete barrier 32 on the far right. A dominant texture on concrete barrier 32 is parallel to the road so it may be a challenge in image 34 to distinguish between structural barrier 32, a marking on the road or a change of road surface color. A relevant issue with respect to the dominant texture on concrete barrier 32, would be to assess if there is a free emergency lane or shoulder to the right of vehicle 38 or does barrier 32 start already on or near white line 39. An observation of barrier 30 shows a vertical texture or posts 30a. The repetitive pattern of the vertical texture may be detected. The vertical texture may be distinguished from the road surface, however there still may be a challenge to estimate a lateral distance to barrier 30 because the bottoms of posts 30a in barrier 30 do not necessarily reach the road surface, Estimating the lateral distance X between vehicle 18 and barrier 30 based on the assumption that posts 30a do reach the road may lead to a significant error in measurement of the lateral distance to barrier 30. For example, if the bottom of post 30a touches the road at circle A, distance Z of 11.2 meter is given from host vehicle 18 and then lateral distance X to barrier 30 is determined to be 3.13 meter to host vehicle 18. If the bottom of post 30a touches the road at circle B, a distance Z of 7.6 m is given and the barrier is 2.12 m lateral distance X to the left of vehicle 36. Additionally, motion aliasing, due to the repetitive pattern of the vertical texture may result in an ambiguous computation of lateral position X of barrier 30. FIGS. 5a and 5b show motion aliasing or how post 30a in FIG. 5a may be matched to a number of similar posts 30a in a second image frame shown in FIG. 5b. Each possible post 30a in the second image translates to a different lateral distance X.

Figure 6A:
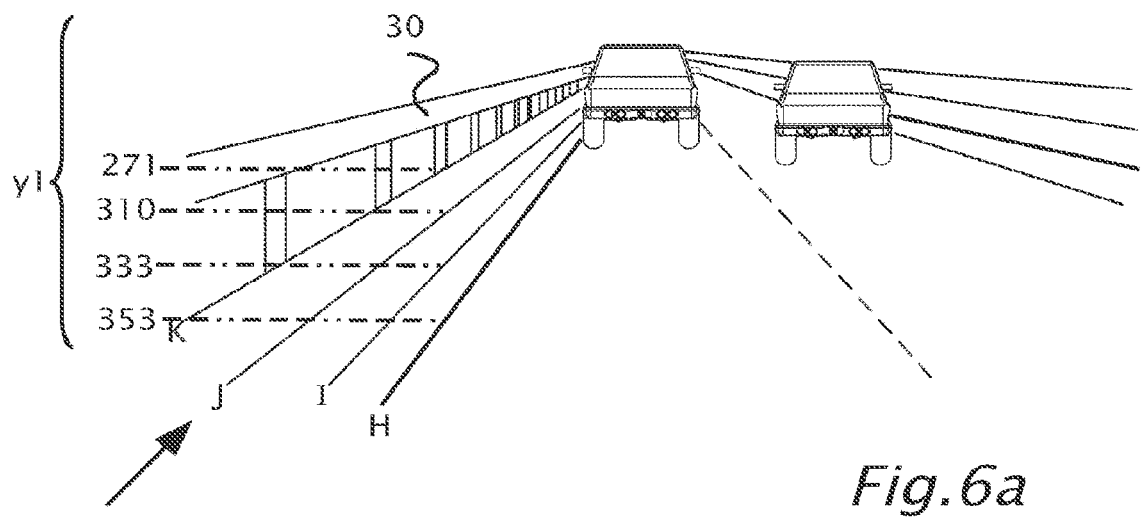
FIGS. 6*a* and 6*b* illustrates forward viewing images frames of road scenes including features of the present invention.
Figure 6B:
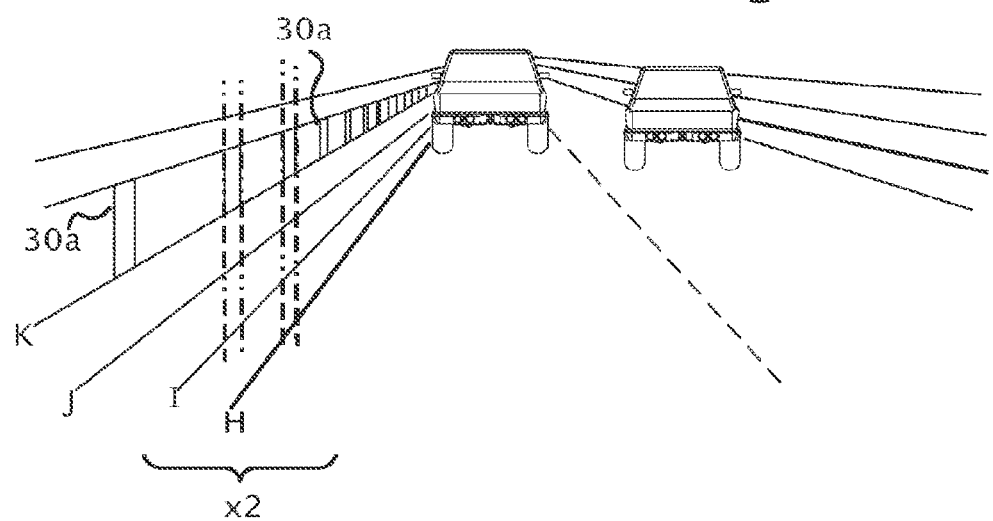

Reference is now made to FIGS. 6a and 6b which show $dz=dt*V$=horizontal image co-ordinate of a post 30a.
f=focal length of camera 12
y1={271, 310, 333, 353}=possible hypotheses of image vertical coordinates possibly corresponding to road surface in image 60a
$Z1=f*H/(y1-yO)$=distance Z
$Z2=Z1-dz$
$X1=Z1*(x1-x0)/f$=lateral distance X
$X2=X1$; new lateral distance X2
$x2=f*X2/Z2+x0$ new horizontal image coordinate of post 30a
={123, 103.5, 90, 76}=possible projections onto a second image 60b.

Figure 6C:
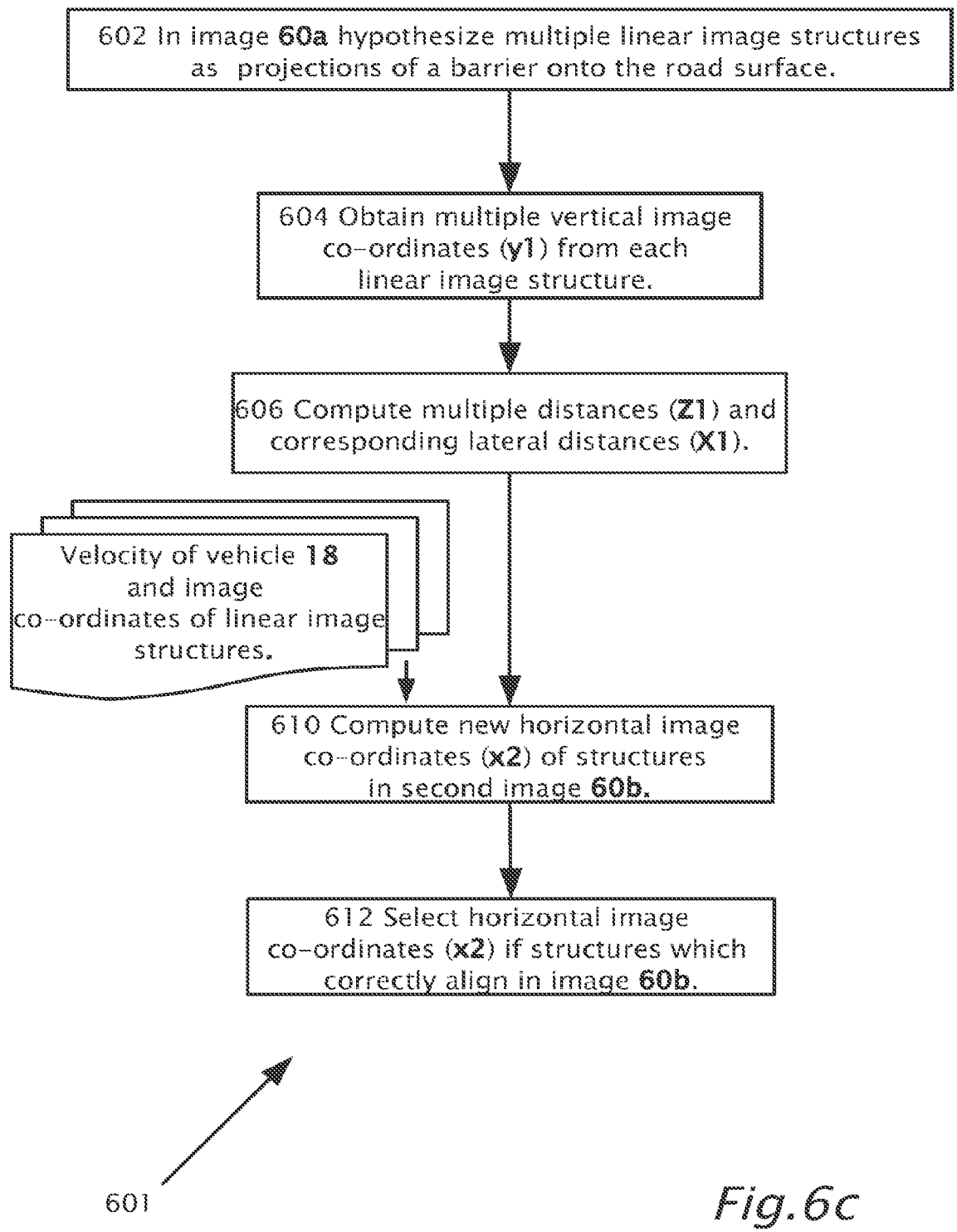
FIG. 6*c* includes a flow diagram of a method according to an aspect of the present invention using the image frames of FIGS. 6*a* and 6*b*.

Referring now to method 601 illustrated in FIG. 6c, for each post 30a in image 60a, hypothesize (step 602) that a post 30a is at the horizontal projection of barrier 30 onto the road surface. Each hypothesis corresponding to one of linear image structures (H,I,J,K) translates to a different image vertical coordinate y1 (step 604) which can then be used to compute a forward distance Z1 and lateral distance X1 (step 606). Given the known forward motion of host vehicle 18, horizontal image co-ordinate of a post 30a can be used to compute (step 610) the new horizontal image coordinate of the post (x2) in image 60b. Only one hypothesis (J) gives a projection x2 that correctly aligns with one post 30a in second image 60b. Linear mark J is therefore a correct hypothesis for the true projection of barrier 30a onto the road plane (step 612). A forward distances Z to post 30a may be determined from host vehicle 18 based on the image motion and the forward motion of host vehicle 18. The lateral distances X from the host vehicle to post 30a may be computed from the forward distance and the horizontal image coordinate of post 30a.

Figure 6D:
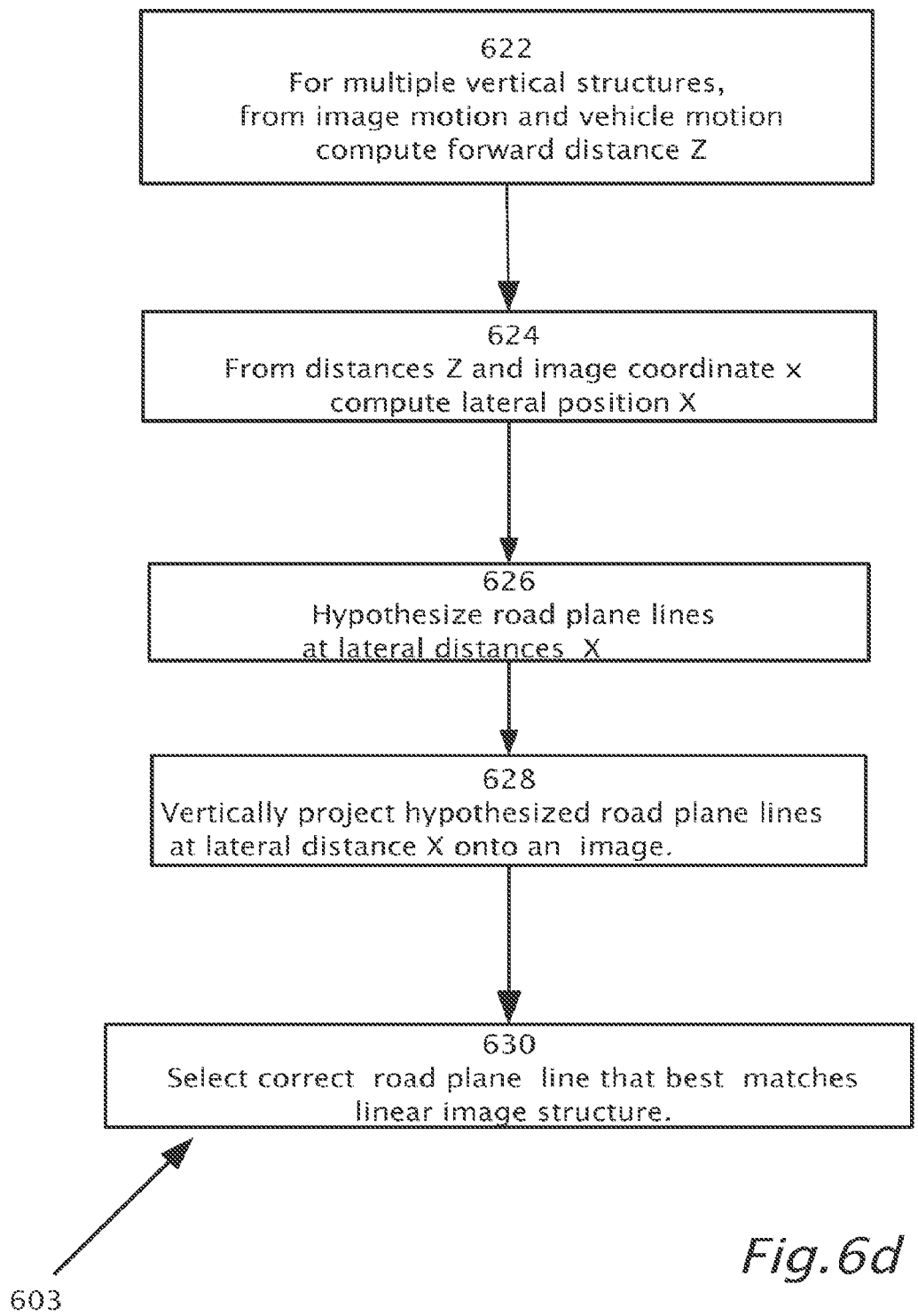
FIG. 6*d* includes a flow diagram of another method according to an aspect of the present invention using the road scenes of FIGS. 6*a* and 6*b*.

Reference is now also made to FIG. 6d, which illustrates an alternative method 603 to method 601. For multiple vertical structures or posts 30a, forward distance Z is computed (step 622) and from the forward distance and horizontal image coordinate, the lateral distances X are computed (step 624) for posts 30a. Linear marks or linear image structure (H,I,J,K) may be assumed (step 626) to be hypothetical road plane lines in the road plane at lateral distances X. However, only one of linear marks (H,I,J,K) is actually in the road plane. The hypothesized road plane lines at different lateral distances X may be projected (step 628) onto an image of structural barrier 30 in image frame 60a. In image frame 60b, the correct linear mark (H,I,J,K) of the hypothesized road plane lines is selected (step 630) by aligning with the image of one of posts 30a in image frame 60b, according to the image motion prediction responsive, to the motion of vehicle 18.

In other words, the image motion of an image patch suspected to be the image of part of a road barrier and the host vehicle motion are used to compute the longitudinal distance (Z) and lateral distance (X) of that patch from host vehicle 18. The X,Ye,Z location is projected into the image point p(x,y), where Ye is taken to be the height of the road plane relative to the camera 12. The patch is verified to be on barrier 30 by corresponding p(x,y) to nearby linear image structures (H,I,J,K).

Posts 30a are tracked sometimes with multiple possible image motions for the same post due aliasing. Each motion gives a X,Z world coordinates for post 30a. Post 30a is projected onto the ground plane (by setting the Y coordinate to Ye). We now have X,Y,Z, coordinates to project into the camera image point p(x,y). Then it is verified if point p(x,y) falls on or close to a linear image structure (H,I,J,K).

Figure 7A:
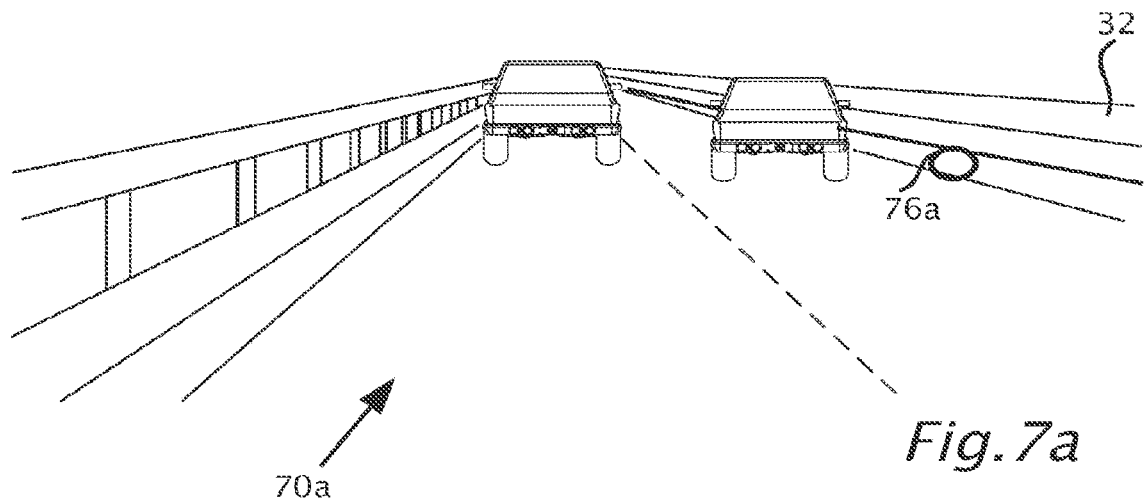
FIGS. 7*a* and 7*b* forward viewing images frames of road scenes including features of the present invention.
Figure 7B:
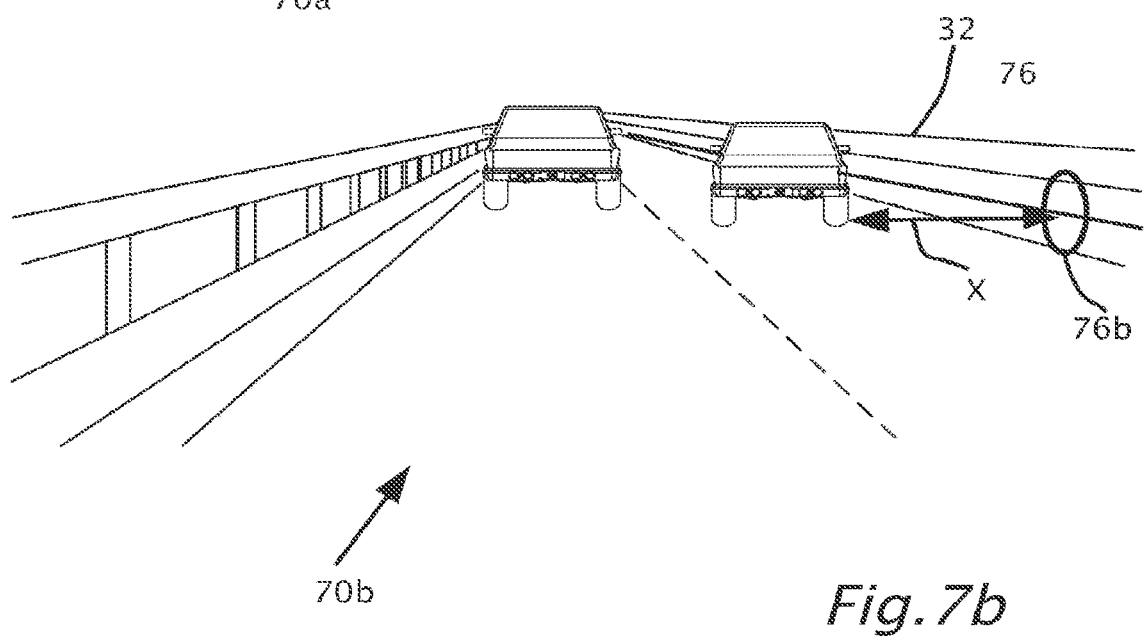
Figure 7C:
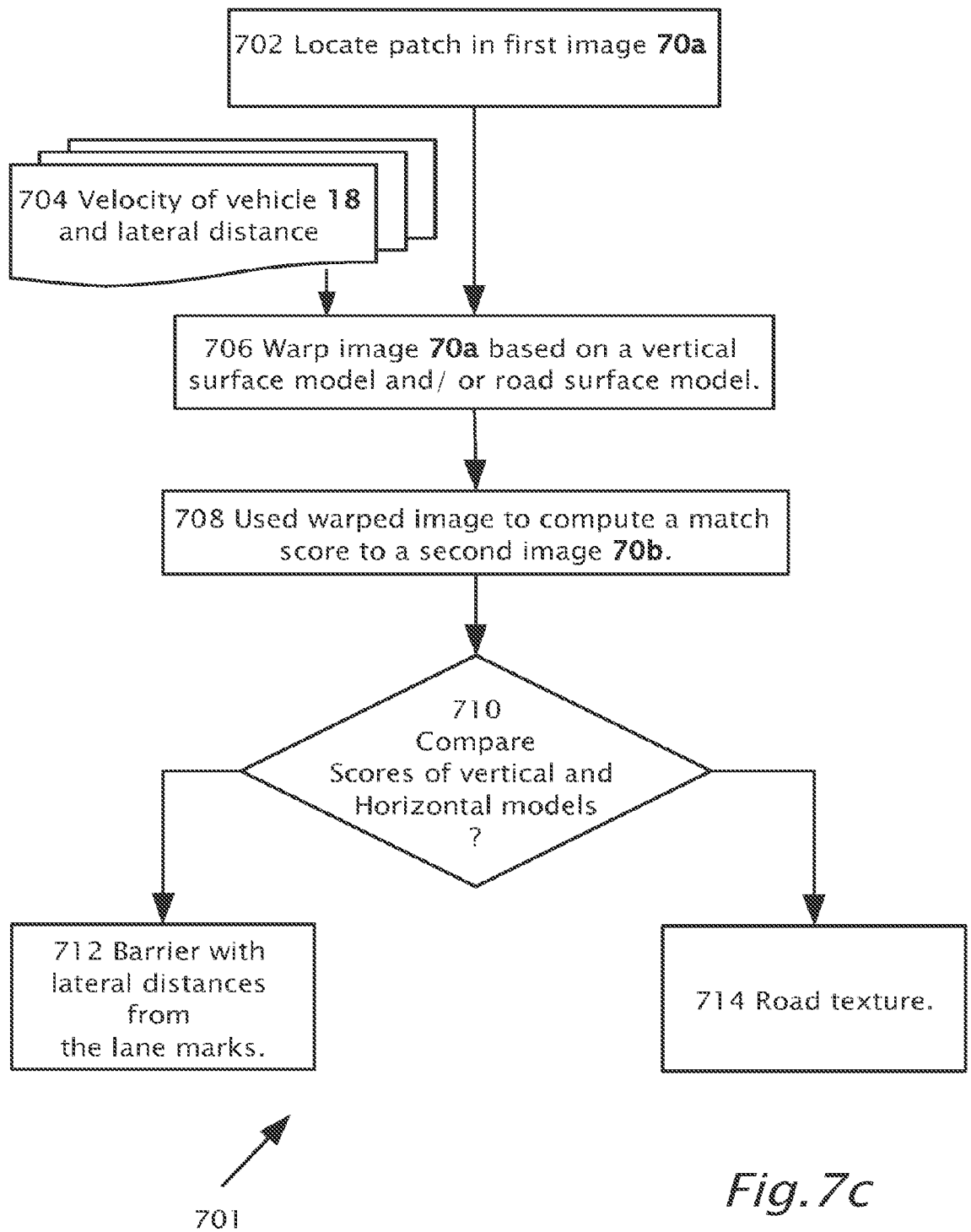
FIG. 7*c* is a flow diagram illustrating yet another method according to an aspect of the present invention.

Reference is now made to FIGS. 7a and 7b which shows two images 70a and 70b and FIG. 7c which shows a method 701 according to an aspect of the present invention. In images 70a and 70b, the image of barrier 12 has an absence of a clearly detectable vertical structure unlike the image provided by barrier 30 and posts 30a (shown in FIGS. 6a and 6h).

The principle of method 701, is to ascertain if a patch in image (schematically shown by ellipse 76a), on or bounded by a line intersecting the lane vanishing point, is a patch on the road surface or an upright (substantially vertical) portion of road barrier 32. However, in image 70a it is a challenge to decide if perhaps patch 76a is road surface. A motion of texture in the patch as host vehicle 18 moves forward may uniquely determine whether the surface of the patch is upright and a part of barrier 32 or the road patch is on the road surface. If the patch is upright, all the points along columns in the patch move together but scale vertically as shown by patch (schematically shown ellipse 76b) in image frame 70b. If the patch is on the road surface, then all points in rows of the patch will move together and scale horizontally. The motion of texture in the patch is typically large and the shape of the patch may change significantly.

Referring now also to method 701, patch 76a is located (step 702). The known vehicle motion and the lateral distance (X) may be used to warp (step 706) image patch 76a using two motion models. One motion model assumes a vertical surface and the other motion model assumes a road surface. A matching score to next image 70b using warped image 70a is then computed (step 708), allowing for some fine alignment to compensate for inexact host vehicle 18 motion. The matching score can be Sum of Square Distance (SDD) or edge based (e.g. Hauussdorf distance). The best matching score in decision step 710 determines whether, the image patch is of a concrete barrier 32 at the lateral distance (X) given by the lane mark (step 712), or if the image patch is of road texture (step 714).

In some cases, methods 601 and 701 may not give a reliable result every image frame 60/70. However, the road structure and presence of a harrier 30, 32 persists over time. Therefore, a model for location of a barrier 30, 32 may be accumulated over many image frames. Multiple hypotheses may be maintained with only the hypotheses above a certain confidence affecting a warning and/or control system 23. Different warning systems may require different levels of confidence: automatic lane change would require almost 100% confidence that there is no barrier 30, 32. While initiating early braking for collision mitigation might require a moderately high (90%) confidence that there is a barrier 30, 32. Early triggering of lane departure warning (LDW) 19 may require a lower confidence.

Multiframe analysis may allow and/or an exchange of information to/front other driver assistance systems LDW 19, FCW 17 allows for the integration of additional cues that might be less frequent. For example, a car passing on the left is a clear indication that there is no barrier 30,32 on the left side. In method 701, lateral motion of host vehicle 18 in the lane of travel may produce a looming effect. The looming effect may be used to determine if the an upper line bounding patch 76 is in fact at the same lateral distance as a lower line hounding patch 76 indicating that patch 76 is part of a barrier 32 or if patch 76 is an image of an object farther away such as in the road or ground surface.

The indefinite articles "a" and "an" is used herein, such as "a patch", "an image" have the meaning of "one or more" that is "one or more patches" or "one or more images".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. A camera system for detection of a barrier, the camera system comprising:
    a camera configured to be mounted to a vehicle, wherein the camera is the only camera of the camera system; and
    a processor configured to:
        obtain multiple image frames from the camera when the vehicle is in motion;
        track image patches between the multiple image frames to determine motion of objects relative to the vehicle, wherein, to track the image patches, the processor is configured to apply an optical flow process to images of the barrier; and
        recognize the barrier along the road from the multiple image frames based on the motion of objects relative to the vehicle.

2. The camera system of claim 1, wherein the image patches represent a structure of the barrier that is off a surface of a road upon which the vehicle is in motion.

3. The camera system of claim 2, wherein the barrier is alongside of the road.

4. The camera system of claim 3, wherein the barrier is part of a central reserve for the road.

5. The camera system of claim 1, wherein, to track the image patches, the processor is configured to track pixels.

6. The camera system of claim 1, wherein the processor is configured to detect the barrier in combination with another driver assistance system that uses the camera.

7. The camera system of claim 1, wherein motion of the vehicle is in at least one of a forward motion or a lateral motion.

8. An electronic device for detection of a barrier, the electronic device comprising:
    an interface to a camera, the camera configured to be mounted to a vehicle; and
    a processor configured to:
        obtain multiple image frames from the camera when the vehicle is in motion;
        track image patches between the multiple image frames to determine motion of objects relative to the vehicle, wherein, to track the image patches, the processor is configured to apply an optical flow process to images of the barrier; and
        recognize the barrier along the road from the multiple image frames based on the motion of objects relative to the vehicle, wherein the camera is the only camera used by the processor to recognize the barrier.

9. The electronic device of claim 8, wherein the image patches represent a structure of the barrier that is off a surface of a road upon which the vehicle is in motion.

10. The electronic device of claim 9, wherein the barrier is alongside of the road.

11. The electronic device of claim 10, wherein the barrier is part of a central reserve for the road.

12. The electronic device of claim 8, wherein, to track the image patches, the processor is configured to track pixels.

13. The electronic device of claim 8, wherein the processor is configured to recognize the barrier in combination with another driver assistance system that uses the camera.

14. The electronic device of claim 8, wherein motion of the vehicle is in at least one of a forward motion or a lateral motion.

15. A non-transitory computer-readable storage medium storing instructions for detecting a barrier, the instructions, when executed by a processor, configure the processor to perform operations comprising:
    obtaining multiple image frames from a camera when a vehicle is in motion and the camera is mounted to the vehicle;
    tracking image patches between the multiple image frames to determine motion of objects relative to the vehicle, wherein tracking the image patches includes applying an optical flow process to images of the barrier; and
    recognizing the barrier along the road from the multiple image frames based on the motion of objects relative to the vehicle, wherein the camera is the only camera used by the processor to recognize the barrier.

16. The non-transitory computer-readable storage medium of claim 15, wherein the image patches represent a structure of the barrier that is off a surface of a road upon which the vehicle is in motion.

17. The non-transitory computer-readable storage medium of claim 16, wherein the barrier is alongside of the road.

18. The non-transitory computer-readable storage medium of claim 17, wherein the barrier is part of a central reserve for the road.

19. The non-transitory computer-readable storage medium of claim 15, wherein tracking the image patches includes tracking pixels.

20. The non-transitory computer-readable storage medium of claim 15, wherein the instructions configure the processor to recognize the barrier in combination with another driver assistance system that uses the camera.

21. The non-transitory computer-readable storage medium of claim 15, wherein motion of the vehicle is in at least one of a forward motion or a lateral motion.

* * * * *